(12) United States Patent
Yamamoto et al.

(10) Patent No.: US 9,731,250 B2
(45) Date of Patent: Aug. 15, 2017

(54) METHOD FOR PRODUCING HOLLOW FIBER CARBON MEMBRANE

(71) Applicant: NOK Corporation, Tokyo (JP)

(72) Inventors: Hirokazu Yamamoto, Shizuoka (JP); Yusuke Ikawa, Shizuoka (JP); Yutaka Koda, Shizuoka (JP)

(73) Assignee: NOK Corporation, Tokyo (JP)

( * ) Notice: Subject to any disclaimer, the term of this patent is extended or adjusted under 35 U.S.C. 154(b) by 91 days.

(21) Appl. No.: 14/769,062

(22) PCT Filed: Feb. 26, 2014

(86) PCT No.: PCT/JP2014/054659
§ 371 (c)(1),
(2) Date: Aug. 19, 2015

(87) PCT Pub. No.: WO2014/132993
PCT Pub. Date: Sep. 4, 2014

(65) Prior Publication Data
US 2016/0008770 A1    Jan. 14, 2016

(30) Foreign Application Priority Data

Feb. 27, 2013   (JP) ................. 2013-036544

(51) Int. Cl.
| | | |
|---|---|---|
| B01D 71/02 | (2006.01) | |
| B01D 71/60 | (2006.01) | |
| B01D 69/08 | (2006.01) | |
| D01D 5/24 | (2006.01) | |
| D01D 5/08 | (2006.01) | |
| D01D 5/06 | (2006.01) | |
| D01D 5/34 | (2006.01) | |
| D01F 9/24 | (2006.01) | |

(52) U.S. Cl.
CPC ........... *B01D 71/021* (2013.01); *B01D 69/08* (2013.01); *B01D 69/087* (2013.01); *B01D 71/60* (2013.01); *D01D 5/06* (2013.01); *D01D 5/24* (2013.01); *D01D 5/34* (2013.01); *D01F 9/24* (2013.01); *B01D 2323/08* (2013.01); *D10B 2331/06* (2013.01); *D10B 2401/10* (2013.01)

(58) Field of Classification Search
None
See application file for complete search history.

(56) References Cited

U.S. PATENT DOCUMENTS 4,787,976 A * 11/1988 Parham .............. B01D 67/0006
                                                            210/500.23
6,171,696 B1    1/2001 Takemura et al.
2010/0212503 A1* 8/2010 Yoshimune ............ B01D 53/22
                                                                        96/10

FOREIGN PATENT DOCUMENTS

| EP | 0 459 623 A1 | 4/1991 |
|---|---|---|
| JP | 4-11933 | 1/1992 |
| JP | 05-220360 | 8/1993 |
| JP | 06-146120 | 5/1994 |
| JP | 2000-45134 A | 2/2000 |
| JP | 2009-34614 A | 2/2009 |
| JP | 2012-081375 | 4/2012 |
| JP | 2013-000713 | 1/2013 |

OTHER PUBLICATIONS

International Preliminary Report on Patentability and Written Opinion from corresponding PCT application No. PCT/JP2014/054659 dated Sep. 11, 2015 (9 pgs).
International Search Report from corresponding PCT application No. PCT/JP2014/054659 dated May 13, 2014 (4 pgs).

* cited by examiner

*Primary Examiner* — Krishnan S Menon
(74) *Attorney, Agent, or Firm* — Brinks, Gilson & Lione

(57) ABSTRACT

Disclosed is a method for producing a hollow fiber carbon membrane using a hollow fiber carbon membrane-forming material by means of a dry method or dry-wet method comprising a spinning step, a drying step, an infusibilization step, and a carbonization step as basic steps; wherein in the infusibilization step, heat treatment is performed at least two times at different temperatures, with the second temperature being higher than the first temperature. It is preferable that the second heat treatment is performed directly after the first treatment is performed, without once cooling to room temperature. The obtained hollow fiber carbon membrane has improved permeability, without reducing its separation coefficient.

6 Claims, No Drawings

METHOD FOR PRODUCING HOLLOW FIBER CARBON MEMBRANE

RELATED APPLICATION

This application is a 35 U.S.C. §371 national phase filing of International Patent Application No. PCT/JP2014/054659, filed Feb. 26, 2014, through which and to which priority is claimed under 35 U.S.C. §119 to Japanese Patent Application No. 2013-036544, filed Feb. 27, 2013, the entire disclosure of which is hereby expressly incorporated by reference.

TECHNICAL FIELD

The present invention relates to a method for producing a hollow fiber carbon membrane. More particularly, the present invention relates to a method for producing a hollow fiber carbon membrane having excellent permeability.

BACKGROUND ART

Among various inorganic membranes, hollow fiber carbon membranes have excellent gas separation properties, and can be used in an environment that requires such high heat resistance and chemical resistance that organic membranes cannot be applied; thus, the practicability of hollow fiber carbon membranes has been highly anticipated. Further, due to the excellent pressure resistance and large membrane area per unit volume, hollow fiber carbon membranes enable the production of compact separation membrane modules.

As carbon membranes having these characteristics, Patent Document 1 discloses a method for producing a hollow fiber carbon membrane comprising a polyimide, and Patent Document 2 discloses a method for producing a hollow fiber carbon membrane comprising a polyphenylene oxide derivative.

A further improvement in processing performance has been required in recent years, and it is challenging to improve the permeability of hollow fiber carbon membranes without reducing their separation coefficient.

PRIOR ART DOCUMENTS

Patent Documents

Patent Document 1: JP-A-4-11933
Patent Document 2: JP-A-2009-34614
Patent Document 3: JP-A-2012-81375
Patent Document 4: JP-A-2013-713

OUTLINE OF THE INVENTION

Problem to be Solved by the Invention

An object of the present invention is to provide a method for producing a hollow fiber carbon membrane, whereby the permeability of the obtained hollow fiber carbon membrane can be improved without reducing its separation coefficient.

Means for Solving the Problem

The above object of the present invention can be achieved by a method for producing a hollow fiber carbon membrane using a hollow fiber carbon membrane-forming material by means of a dry method or dry-wet method comprising a spinning step, a drying step, an infusibilization step, and a carbonization step as basic steps; wherein in the infusibilization step, heat treatment is performed at least two times at different temperatures, with the second temperature being higher than the first temperature.

Effect of the Invention

The method for producing a hollow fiber carbon membrane according to the present invention has an excellent effect in that the permeability of the obtained hollow fiber carbon membrane can be improved without reducing its separation coefficient by performing heat treatment in the infusibilization step at least two times at different temperatures. More specifically, such an excellent permeability that water permeability coefficient P is $5 \times 10^{-7}$ mol/cm$^2$·sec·Pa or more is obtained.

Moreover, the use of a water-soluble organic polyamine aqueous solution as a core liquid during the spinning of a polyphenylene oxide-based polymer allows mass and rapid production of hollow fiber carbon membrane-forming polymer precursors while suppressing the incidence of defects during the production of the polymer precursors. Furthermore, the selection of a water-soluble organic polyamine enables achievement of reduction of further yarn breakage in the step of spinning the hollow fiber carbon membrane-forming polymer precursors, decrease in diameter (thinning) due to stretching, and reduction of yarn breakage caused by winding and drying.

EMBODIMENTS FOR CARRYING OUT THE INVENTION

As described in the Background Art section, Patent Documents 1 and 2 disclose inventions that can be considered to be basic methods for producing hollow fiber carbon membranes. Such a hollow fiber carbon membrane is produced using a hollow fiber carbon membrane-forming material by a method comprising the following spinning step, drying step, infusibilization step, and carbonization step as basic steps (see Patent Document 2).

The method for producing a hollow fiber carbon membrane according to the present invention also follows the following basic step examples.

(1) Spinning step: An organic solvent solution of a polyphenylene oxide-based polymer (spinning dope) is extruded simultaneously with a core liquid, such as an inorganic salt aqueous solution or water, using a hollow fiber spinning nozzle having a double tube structure by a wet spinning method or a dry-wet spinning method (see FIG. 2 in Patent Document 2)

(2) Drying step: The hollow fiber carbon membrane-forming polymer precursor (hollow fiber material) of the polyphenylene oxide-based polymer obtained in the spinning step is dried (3) Infusibilization step: The dried hollow fiber material (i.e., precursor) is subjected to infusibilization under heat treatment conditions of about 150 to 300° C. for about 0.5 to 4 hours (4) Carbonization step: The infusibilized hollow fiber material is heated under reduced pressure of $10^{-4}$ atm or less, or under an inert gas atmosphere in which air is replaced by helium, argon gas, nitrogen gas, or the like, at about 450 to 850° C. for about 0.5 to 4 hours Here, the material for producing a hollow fiber carbon membrane may be used any known carbon-forming material (polymer); however, preferably used is the polyphenylene oxide-based polymer described in Patent Document 2, such as polyphenylene oxide or polyphenylene oxide derivatives in which 1 to 4 hydrogen atoms of the aromatic ring are replaced by a halogen atom, a sulfone group, a carboxyl group, a lower alkyl group, a tri-lower alkyl silyl group, a diarylphosphino group, or the like, directly or via a $CH_2$ group. For example, sulfonated poly(2,6-dimethyl-1,4-phenylene oxide) having a sulfonation degree of about 20 to 40%, preferably about 25 to 35%, is used. The lower alkyl group as mentioned herein refers to an alkyl group having 1 to 5 carbon atoms.

[Spinning Step]

A polymer is dissolved in an organic solvent that can dissolve the polymer, such as methanol, ethanol, tetrahydrofuran, N,N-dimethylacetamide, N-methyl-2-pyrrolidone, or a mixture thereof, to a concentration of about 20 to 40 wt. %, preferably about 25 to 33 wt. %, thereby preparing a spinning dope (membrane-forming solution). The prepared spinning dope is extruded by a wet spinning method or a dry-wet spinning method from the outer tube of a hollow fiber spinning nozzle having a double tube annular structure into a coagulation bath, such as water or a water-soluble organic polyamine aqueous solution, while a core liquid, preferably a water-soluble organic polyamine aqueous solution having a concentration of about 10 to 30 wt. %, preferably about 10 to 20 wt. %, that is insoluble to the solvent and polymer in the membrane-forming solution, is simultaneously extruded from the inner tube of the spinning nozzle, thereby molding a hollow fiber carbon membrane-forming polymer precursor. In this case, the temperatures of the core liquid and the coagulation bath are set to be, for example, −20 to 60° C., preferably 0 to 3° C.

Examples of the water-soluble organic polyamine include water-soluble polyamine compounds, such as diamine compounds and triamine compounds, having an aqueous solution concentration of about 10 to 30 wt. %. For example, the following compounds are used.

Alkylenediamines
　Ethylenediamine $H_2N(CH_2)_2NH_2$
　Trimethylenediamine $H_2N(CH_2)_3NH_2$
　Tetramethylenediamine $H_2N(CH_2)_4NH_2$
　Pentamethylenediamine $H_2N(CH_2)_5NH_2$
　Hexamethylenediamine $H_2N(CH_2)_6NH_2$ Polyethylenepolyamines
　Diethylenetriamine $NH_2CH_2CH_2NHCH_2CH_2NH_2$
　Triethylenetetramine
　　$NH_2CH_2CH_2NHCH_2CH_2NHCH_2CH_2NH_2$
　Tetraethylenepentamine
　　$NH_2CH_2CH_2NHCH_2CH_2NHCH_2CH_2NHCH_2$-$CH_2NH_2$
　Pentaethylenehexamine
　　$NH_2CH_2CH_2NHCH_2CH_2NHCH_2CH_2NHCH_2$-$CH_2NHCH_2CH_2NH_2$ Aminoalkyl group-containing amines
　Bis(2-aminoethyl)amine $(H_2NCH_2CH_2)_2NH$
　Tris(2-aminoethyl)amine $(H_2NCH_2CH_2)_3N$
　N,N-bis(3-aminopropyl)methylamine
　　$(H_2NCH_2CH_2CH_2)_2NCH_3$ Ether group-containing amines
　Bis(2-dimethylaminoethyl)ether $(H_3C)_2$-$NCH_2CH_2OCH_2CH_2N(CH_3)_2$
　Polyoxyalkylenetriamine $H_2NR(OR)_xO$—$CH_2$—$CH$-$[O(RO)_yRNH]CH_2O(RO)_zRNH_2$
　　x, y, z: integers of 2 or more Organic amine-based polymers having a weight average molecular weight Mw of 200 to 1,500
　Polyethyleneimine
　Polyvinylamine
　Polyallylamine In terms of reduction of yarn breakage in the step of spinning the hollow fiber carbon membrane-forming polymer precursor, decrease in diameter (thinning) due to stretching, and reduction of yarn breakage caused by winding and drying, aminoalkyl group-containing amines, ether group-containing amines, and organic amine-based polymers having a weight average molecular weight Mw of 200 to 1,500 are preferably used among these water-soluble organic polyamines. Moreover, such a water-soluble organic polyamine can be used also as a coagulating liquid having the same concentration range as the core liquid.

As a method that allows mass and rapid production of hollow fiber carbon membranes, the present applicant has previously proposed a method for producing a hollow fiber carbon membrane comprising the above steps as the basic steps, wherein a spun hollow fiber material is wound on a bobbin, and then water and a core liquid remaining in the hollow portion are discharged (Patent Document 3). According to this production method, when a water-soluble organic polyamine aqueous solution having a predetermined concentration is used as the core liquid, operating efficiency can be improved while suppressing the incidence of defects in the obtained hollow fiber carbon membranes.

In the spinning step, the diameter of the outer tube of the hollow fiber spinning nozzle having a double tube annular structure and the ratio of the winding speeds, etc., can be suitably adjusted to thereby produce a hollow fiber material that can form a hollow fiber carbon membrane whose film thickness is adjusted.

The hollow fiber carbon membrane-forming polymer precursor obtained by spinning is preferably wound on the above-mentioned bobbin (winding bobbin for draining) The winding bobbin for draining used has an outer periphery of about 0.5 to 2.0 m, preferably about 0.7 to 1.2 m. The speed of winding the hollow fiber carbon membrane-forming polymer precursor is about 10 to 80 m/min, preferably about 20 to 60 m/min. Moreover, the length of the hollow fiber carbon membrane-forming polymer precursor to be wound is about 100 to 8,000 m, preferably about 2,000 to 4,000 m. The bobbin on which the hollow fiber carbon membrane-forming polymer precursor is wound is stored in water in a water tank, etc. The storage period is generally 0.5 to 14 days, preferably 1 to 7 days, including the treatment time for a draining step, described next.

[Draining Step]

As described in Patent Document 3, the hollow fiber material wound on the winding bobbin for draining is cut along a line connecting both ends of the bobbin in a state where the hollow fiber material is placed in a water tank. After the cut hollow fiber materials are stored in water, they are allowed to hang in the direction of gravity with both ends open, thereby removing the core liquid and water from the hollow fiber materials. Alternatively, the polymer portions of the hollow fiber materials can be dried in such a manner that a weight is allowed to hang from the bottom end of each hollow fiber material with the top end open; however, it is preferable, as shown in Patent Document 4, that while keeping a state where the hollow fiber material is stored in water, one end of the hollow fiber material is opened, and the other end is connected and fixed to, for example, a tube for applying air pressure using an adhesive, etc. Then, air at a gauge pressure of about 20 to 300 kPaG, preferably about 100 to 200 kPaG, is blown into the hollow portion of the hollow fiber material. Thus, draining is performed. In this case, when the hollow fiber material has crushed parts, etc., air pressure is not uniformly applied to the hollow portion, and draining cannot sufficiently be performed. Moreover, when air at an air pressure lower than the above range is blown, the desired discharge of the core liquid and water cannot be completely made. In contrast, when air at an air pressure higher than the above range is blown, fracture of the hollow fiber material may occur due to the pressure, etc. When the length of the hollow fiber carbon membrane-forming polymer precursor is 2,000 m, the time required for the draining step is about 8 hours under pressure conditions of 100 kPa. The above operations can almost completely discharge the core liquid and water present in the hollow portion of the hollow fiber material.

[Bobbin Drying Step]

The hollow fiber material that has been drained in a state where the hollow fiber material is wound on the bobbin is dried by a dryer at room temperature to about 80° C., preferably about 25 to 35° C., and then wound on a dried product-winding bobbin that is preferably different from the winding bobbin for draining. The drained hollow fiber material is wound off from the winding bobbin for draining on which the hollow fiber material is wound, and passed through a cylindrical dryer placed between the two bobbins at a speed, converted to linear speed, of about 5 to 100 cm/sec, preferably about 30 to 80 cm/sec, under ventilation conditions. Thus, drying is performed. The dried product is wound on the winding bobbin at a winding speed of about 4 to 20 m/min, preferably about 8 to 14 m/min, although it depends on dry temperature conditions.

Any bobbin can be used as the dried product-winding bobbin, as long as hollow fiber materials are not brought into contact with each other. For example, a bobbin provided with coiled grooves at intervals of about 0.5 to 5 mm, preferably about 1 to 2 mm, in the shaft of the dried product-winding part can be used. Winding is performed in such a manner that the entire length of the hollow fiber material is wound using one or more such winding bobbins for drying.

[Infusibilization Step]

The dried hollow fiber material is subjected to infusibilization before carbonization. Infusibilization is performed by performing heat treatment at least twice at different temperatures. All of the heat treatments are performed at a temperature lower than the carbonization temperature. The heat treatment conditions vary depending on the type and amount of the material, etc. In general, the first heat treatment is performed under conditions of about 150 to 280° C. for about 0.5 to 4 hours, preferably about 200 to 270° C. for about 0.5 to 2 hours; and the second heat treatment is subsequently performed under conditions of about 200 to 350° C. for about 0.5 to 4 hours, preferably about 250 to 320° C. for about 0.5 to 2 hours, in which the temperature is higher than the first heat treatment temperature.

The heat treatments are performed as follows. After the first heat treatment is performed, the temperature is directly changed to the second heating temperature, and the second heat treatment is performed. Alternatively, after the first heat treatment is performed, the temperature is once cooled to room temperature, and the second heat treatment is performed. It is preferable that after the first heat treatment is performed, the temperature is directly changed to the second heating temperature without once being cooled to room temperature, and the second heat treatment is performed. This infusibilization method particularly improves the performance as a hollow fiber carbon membrane. As a result, the permeability of the obtained hollow fiber carbon membrane can be improved without reducing its separation coefficient. Heat treatment can be performed three times or more. In that case, heating is always performed at a temperature higher than the previous heating temperature.

[Carbonization Step]

After infusibilization, carbonization is performed by a known method. For example, the infusibilized hollow fiber carbon membrane-forming polymer precursor in a state where the polymer precursor is cut into a length of about 0.2 m to 1 m, or wound on the winding bobbin, is placed in a container, and heated under reduced pressure of about 10 Pa or less, preferably about 10 to 4 Pa, or under an inert gas atmosphere in which air is replaced by helium, argon gas, nitrogen gas, or the like, without reduced pressure. Thus, carbonization is performed. Carbonization is generally performed under conditions of about 450 to 850° C. for about 0.5 to 4 hours, although the conditions vary depending on the type and amount of the material, etc.

EXAMPLES

The following describes the present invention with reference to Examples.

Example 1

A membrane-forming solution having a concentration of 25 wt. % was prepared by dissolving 50 g of sulfonated poly(2,6-dimethyl-1,4-phenylene oxide) [sulfonation degree: 30%] in 150 g of dimethylformamide. Using an annular hollow fiber spinning nozzle having a double tube structure (outer diameter: 0.5 mm, inner diameter: 0.25 mm), the prepared membrane-forming solution was passed through the outer tube of the nozzle, while 15 wt. % of N,N-bis(3-aminopropyl)methylamine as a core liquid was passed through the inner tube of the nozzle. The membrane-forming solution and the core liquid were simultaneously extruded into water by a wet spinning method, thereby obtaining a hollow fiber carbon membrane-forming polymer precursor. The polymer precursor was wound on a rotating bobbin having an outer periphery of about 1 m (winding bobbin for draining) at a winding speed of about 40 m/min. Thus, the hollow fiber carbon membrane-forming polymer precursor was obtained.

One end of the hollow fiber carbon membrane-forming polymer precursor (outer diameter: 500 μm) was connected and fixed to a tube (inner diameter: 6 mm) using an epoxy adhesive. Air at a gauge pressure of 100 kPaG was supplied from the tube side to discharge the core liquid and water contained in the hollow portion of the hollow fiber carbon membrane-forming polymer precursor.

The hollow fiber carbon membrane-forming polymer precursor was passed through the inside of a cylindrical heated-air dryer disposed between the bobbin on which the hollow fiber carbon membrane-forming polymer precursor was wound (winding bobbin for draining) and a bobbin for winding the dried hollow fiber carbon membrane-forming polymer precursor (dried product-winding bobbin). Ventilation was performed at 40° C. at a speed, converted to linear speed, of about 40 cm/sec, and the polymer precursor was wound on the dried product-winding bobbin at a winding speed of 10 m/min. Thus, drying was performed. The dried product-winding bobbin as used herein had an outer periphery of 1 m, and was provided with grooves at intervals of 3 mm in the shaft part.

The dried hollow fiber carbon membrane-forming polymer precursor was placed in a heating device in a state where the polymer precursor is wound on the bobbin and subjected to a first heat treatment at 250° C. for 1 hour. After cooling to room temperature, the polymer precursor was cut into a length of 0.5 m, and then subjected to a second heat treatment at 270° C. for 1 hour. Thus, infusibilization was performed.

The infusibilized hollow fiber carbon membrane-forming polymer precursors were subjected to carbonization under an inert gas atmosphere at 550° C., 600° C., or 650° C., each for 2 hours, thereby obtaining hollow fiber carbon membranes.

The permeability of the obtained hollow fiber carbon membranes was measured by a pervaporation separation method. Specifically, an isopropanol-water (weight ratio=90:10) mixed solution was used as a feed liquid, and the permeate side was reduced pressure to about 1 kPa. The water permeability rate P (mol/cm$^2$·sec·Pa) was measured from the weight of the permeated substance and the composition of water/isopropanol, and the ideal separation coefficient α was calculated. As a result, the water permeability rate P was $5.6 \times 10^{-7}$ mol/cm$^2$·sec·Pa at a carbonization temperature of 550° C., $8.4 \times 10^{-7}$ mol/cm$^2$·sec·Pa at 600° C., and $8.3 \times 10^{-7}$ mol/cm$^2$·sec·Pa at 650° C. The ideal separation coefficient α was 10,000 or more in all cases.

Example 2

In Example 1, hollow fiber carbon membranes were obtained while changing the second heat treatment temperature in the infusibilization treatment to 290° C. When the permeability of the obtained hollow fiber carbon membranes was measured, the water permeability rate P was $6.3 \times 10^{-7}$ mol/cm$^2$·sec·Pa at a carbonization temperature of 550° C., $7.6 \times 10^{-7}$ mol/cm$^2$·sec·Pa at 600° C., and $9.8 \times 10^{-7}$ mol/cm$^2$·sec·Pa at 650° C. The ideal separation coefficient α was 10,000 or more in all cases.

Example 3

In Example 1, hollow fiber carbon membranes were obtained while changing the second heat treatment temperature in the infusibilization treatment to 310° C. When the permeability of the obtained hollow fiber carbon membranes was measured, the water permeability rate P was $5.9 \times 10^{-7}$ mol/cm$^2$·sec·Pa at a carbonization temperature of 550° C., $9.6 \times 10^{-7}$ mol/cm$^2$·sec·Pa at 600° C., and $1.1 \times 10^{-6}$ mol/cm$^2$·sec·Pa at 650° C. The ideal separation coefficient α was 10,000 or more in all cases.

Comparative Example 1

In Example 1, heat treatment was performed only once at 250° C. for 1 hour as the infusibilization treatment. Then, the polymer precursor was cut into a length of 0.5 m, and the cut polymer precursors were subjected to carbonization, thereby obtaining hollow fiber carbon membranes. When the permeability of the obtained hollow fiber carbon membranes was measured, the water permeability rate P was $1.5 \times 10^{-7}$ mol/cm$^2$·sec·Pa at a carbonization temperature of 550° C., $1.4 \times 10^{-7}$ mol/cm$^2$·sec·Pa at 600° C., and $1.5 \times 10^{-7}$ mol/cm$^2$·sec·Pa at 650° C. The ideal separation coefficient α was 10,000 or more in all cases.

Comparative Example 2

In Example 1, heat treatment was performed only once at 270° C. for 1 hour as the infusibilization treatment. Then, the polymer precursor was cut into a length of 0.5 m, and the cut polymer precursors were subjected to carbonization, thereby obtaining hollow fiber carbon membranes. When the permeability of the obtained hollow fiber carbon membranes was measured, the water permeability rate P was $1.5 \times 10^{-7}$ mol/cm$^2$·sec·Pa at a carbonization temperature of 550° C., $1.7 \times 10^{-7}$ mol/cm$^2$·sec·Pa at 600° C., and $1.5 \times 10^{-7}$ mol/cm$^2$·sec·Pa at 650° C. The ideal separation coefficient α was 10,000 or more in all cases.

Comparative Example 3

In Example 1, heat treatment was performed only once at 290° C. for 1 hour as the infusibilization treatment. Then, the polymer precursor was cut into a length of 0.5 m, and the cut polymer precursors were subjected to carbonization, thereby obtaining hollow fiber carbon membranes. When the permeability of the obtained hollow fiber carbon membranes was measured, the water permeability rate P was $2.2 \times 10^{-7}$ mol/cm$^2$·sec·Pa at a carbonization temperature of 550° C., $2.1 \times 10^{-7}$ mol/cm$^2$·sec·Pa at 600° C., and $1.8 \times 10^{-7}$ mol/cm$^2$·sec·Pa at 650° C. The ideal separation coefficient α was 10,000 or more in all cases.

Comparative Example 4

In Example 1, heat treatment was performed only once at 310° C. for 1 hour as the infusibilization treatment. The hollow fiber carbon membrane-forming polymer precursor underwent yarn breakage and fracture during heat treatment. As a result, hollow fiber carbon membranes could not be obtained.

Example 4

In Example 1, the second heat treatment in the infusibilization step was performed without cooling after the first heat treatment. After cooling to room temperature, the polymer precursor was cut into a length of 0.5 m, and the cut polymer precursors were subjected to carbonization at 600° C. for 2 hours, thereby obtaining hollow fiber carbon membranes. When the permeability of the obtained hollow fiber carbon membranes was measured, the water permeability rate P was $8.3 \times 10^{-7}$ mol/cm$^2$·sec·Pa, and the ideal separation coefficient α was 10,000 or more.

Example 5

In Example 2, the second heat treatment in the infusibilization step was performed without cooling after the first heat treatment. After cooling to room temperature, the polymer precursor was cut into a length of 0.5 m, and the cut polymer precursors were subjected to carbonization at 600° C. for 2 hours, thereby obtaining hollow fiber carbon membranes. When the permeability of the obtained hollow fiber carbon membranes was measured, the water permeability rate P was $9.5 \times 10^{-7}$ mol/cm$^2$·sec·Pa, and the ideal separation coefficient α was 10,000 or more.

Example 6

In Example 1, the second heat treatment in the infusibilization step was performed without cooling to room temperature after the first heat treatment. Further, a third heat treatment was performed at 310° C. for 1 hour without cooling after the second heat treatment. After cooling to room temperature, the polymer precursor was cut into a length of 0.5 m, and the cut polymer precursors were subjected to carbonization at 600° C. for 2 hours, thereby obtaining hollow fiber carbon membranes. When the permeability of the obtained hollow fiber carbon membranes was measured, the water permeability rate P was $8.9 \times 10^{-7}$ mol/cm$^2$·sec·Pa, and the ideal separation coefficient α was 10,000 or more.

The invention claimed is:

1. A method for producing a hollow fiber carbon membrane using a hollow fiber carbon membrane-forming material by means of a dry method or dry-wet method comprising a spinning step, a drying step, an infusibilization step, and a carbonization step as basic steps;
   wherein in the infusibilization step, heat treatment is performed at least two times at different temperatures, with the second temperature being higher than the first temperature;
   in the spinning step, spinning is performed using a water-soluble organic polyamine aqueous solution having a concentration of 10 to 30 wt. % as a core liquid.

2. The method for producing a hollow fiber carbon membrane according to claim 1, wherein in the infusibilization step, after the first heat treatment is performed, the temperature is changed directly to the second heating temperature without once being cooled to room temperature, and the second heat treatment is performed.

3. The method for producing a hollow fiber carbon membrane according to claim 1, wherein in the infusibilization step, after the first heat treatment is performed at a heating temperature of 150 to 280° C., the second heat treatment is performed at a heating temperature of 200 to 350° C., which is higher than the first heating temperature.

4. The method for producing a hollow fiber carbon membrane according to claim 1, wherein the hollow fiber carbon membrane-forming material is a polyphenylene oxide-based polymer.

5. The method for producing a hollow fiber carbon membrane according to claim 1, wherein the water-soluble organic polyamine is an alkylenediamine, polyethylene polyamine, aminoalkyl group-containing amine, ether group-containing amine, or water-soluble organic amine-based polymer having a weight average molecular weight Mw of 200 to 5,000.

6. The method for producing a hollow fiber carbon membrane according to claim 2, wherein in the infusibilization step, after the first heat treatment is performed at a heating temperature of 150 to 280° C., the second heat treatment is performed at a heating temperature of 200 to 350° C., which is higher than the first heating temperature.

* * * * *